(No Model.)
G. A. FORD.
PULLEY BLOCK.
No. 253,859. Patented Feb. 21, 1882.
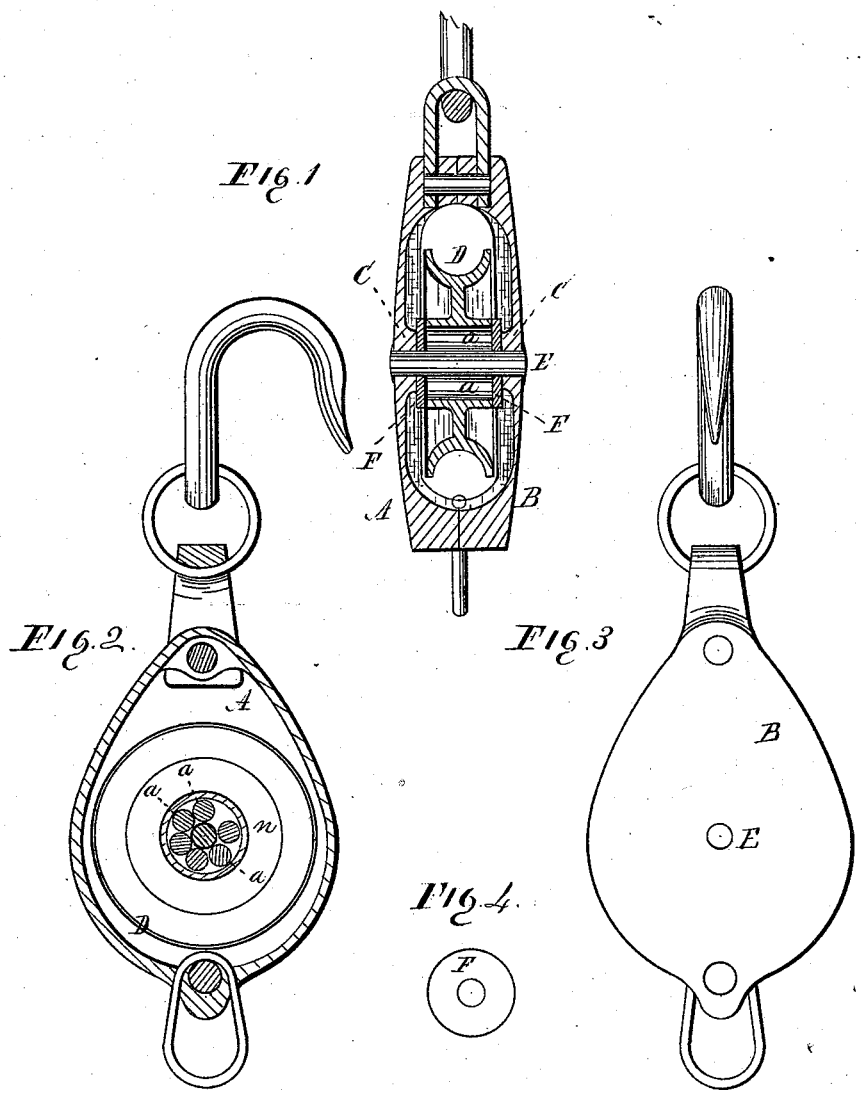
Witnesses.
F. L. Byerly
J. H. Burridge
Inventor.
G. A. Ford
W. H. Burridge
atty

UNITED STATES PATENT OFFICE.

GEORGE A. FORD, OF CLEVELAND, OHIO.

PULLEY-BLOCK.

SPECIFICATION forming part of Letters Patent No. 253,859, dated February 21, 1882.

Application filed August 23, 1881. (No model.)

*To all whom it may concern:*

Be it known that I, GEORGE A. FORD, of Cleveland, Cuyahoga county, State of Ohio, have invented certain new and useful Improvements in Pulley-Blocks; and I do hereby declare the following to be a full and complete description thereof.

The improvement in pulley-blocks referred to consists of a series of loose rollers inserted between the axial pin of the sheave and the hub of the sheave, thereby nearly surrounding the said pin with free anti-friction rollers, on which the sheave revolves, in combination with the rollers, which are kept in place within the hub by washers, one on each side, and against which the ends of the rollers abut, which washers are sustained in place by the bosses formed on the inside of each cheek-piece. The sheave, rollers, and washers are mounted upon a shaft within two cheek-pieces or plates, to which the shaft is secured.

For a further and more complete description of the said invention, reference will be had to the following specification and to the annexed drawings, making part of the same, in which—

Figure 1 represents a vertical transverse section of the pulley-block. Fig. 2 is a side view of the interior of the block, partially in section. Fig. 3 is a side view of the exterior, and Fig. 4 is a detached section.

Like letters denote like parts in the several views.

The shell of the pulley-block consists of two concavo-convex cheeks, A B, each of which is provided on the inner side with a central boss, C, forming shoulders for the lateral support of the hub of the sheave D, and through which and the hub of the sheave the axial pin E passes, as seen in Fig. 1. The hole in the hub of the sheave is large and adapted to receive the axial pin E, and also the series of rollers *a a* arranged between or around the said pin and the inside of the hub, thereby nearly surrounding the pin with free anti-friction rollers for the axial bearing of the sheave.

The rollers *a* are free—that is, they are loose—and rotate upon the axial pin as the sheave revolves, the rollers being unconfined by any pivotal connection with the side plates or washers, F, which plates only serve to retain the rollers within the hub, and against which their ends abut without being journaled therein. The plates also prevent lateral displacement of the rollers. A detached view of the side plates is shown in Fig. 4.

It will be seen in Fig. 2 that the uppermost roller is directly above the axial pin and mainly supporting the weight raised by the pulley, it being in alignment with the resistance or weight which is moved, thereby causing the sheave to revolve readily and with but frictional wearing upon the axial pin between the uppermost or bearing roller and the preceding roller. At or near the point *n* is a space to allow the bearing-roller to move immediately away from the following one to avoid their crowding one upon the other. Hence there is no frictional wearing of the rollers in their free movement around the axial pin, as there would be were the rollers in contact with each other.

I am aware that anti-friction rollers have been used in connection with the sheave of a pulley-block; but such rollers have been so adjusted to each other and around the axial pin or shaft as to produce frictional resistance and to prevent actual contact one with the other. They have been journaled in side washers, which adds largely to the expense in the manufacture of the block and adds to the friction of the moving parts.

It will be obvious that this expense in the manufacture of the pulley-block is avoided by the construction and arrangement of my improvement, whereby the rollers have no frictional bearing in side plates or washers, but are so arranged that when one roller of the series is uppermost it will be remote from the preceding one, as shown in the drawings. The series of rollers in this way will be as efficient as a gang of rollers journaled in side plates in the ordinary manner, and without the friction of the gang.

As the washers which sustain the ends of the anti-friction rollers are loose, but are retained by the bosses C raised on the inside of the cheek-pieces, they are therefore free to revlove with the hub, or remain stationary should the ends of the anti-friction rollers impinge upon one or both of them, thus being an advantage over plates which are fixed to the hub.

What I claim as my improvement, and desire to secure by Letters Patent, is—

In pulley-blocks, a series of free anti-friction rollers, placed around the axle of the pulley, having a vacant space nearly or equal to the diameter of one of the rollers, in combination with loose end washers, and the bosses of the cheek-pieces, substantially as and for the purpose described.

In testimony whereof I affix my signature in presence of two witnesses.

GEORGE A. FORD.

Witnesses:
   J. H. BURRIDGE,
   W. H. BURRIDGE.